3,390,191
HYDROGENATION OF METHYL TRIFLUOROACETATE TO TRIFLUOROETHANOL

Louis G. Anello, Basking Ridge, and William J. Cunningham, Rockaway, N.J., assignors to Allied Chemical Corporation, New York, N.Y., a corporation of New York
No Drawing. Filed Mar. 24, 1964, Ser. No. 354,446
9 Claims. (Cl. 260—633)

This invention relates to the preparation of 2,2,2-trifluoroethanol by the catalytic hydrogenation of methyl trifluoroacetate.

Trifluoroethanol is a known compound and can be prepared by a process involving a high pressure, high temperature reaction of trifluoroethyl chloride with potassium acetate followed by saponification of the resulting acetate ester. This and other suggested prior procedures are relatively complicated and not satisfactory for economical commercial use. It is an object of the present invention to provide a process for making trifluoroethanol from methyl trifluoroacetate by an easily controllable, catalytic gas phase reaction carried out at ordinary pressure and at relatively low temperature.

Thus in accordance with this invention, hydrogen is reacted with methyl trifluoroacetate in vapor phase at a temperature within the range of about 200° to 400° C. in the presence of a chromium oxide-copper oxide acid to alcohol reduction catalyst consisting essentially of chromium oxide and copper oxide.

The reaction proceeds according to the equation

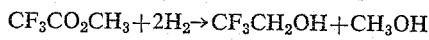
$$CF_3CO_2CH_3 + 2H_2 \rightarrow CF_3CH_2OH + CH_3OH$$

with conversions ranging up to about 38% and yield based on methyl trifluoroacetate consumed ranging up to about 66%.

The reaction conditions include a temperature within the range of about 200° to 400° C., preferably within the range of about 225° to 325° C., a pressure of atmospheric to 5 atmospheres, a hydrogen to methyl trifluoroacetate mole ratio of about 0.25 to 50:1 respectively, although lower and higher mole ratios can be used, preferably about 0.5 to 5:1 and a space velocity of within the range of about 100 to 1000, preferably within the range of about 200 to 500, the space velocity being the volumes of reactant gas measured at room temperature per volume of catalyst in the reactor per hour. At temperatures lower than about 200° C., little or no reaction is obtained, whereas at temperatures above about 400° C., there is marked fragmentation of organic material with the formation of undesired by-products such as $CHF_3$, $CO_2$, $CH_4$, and HF and carbon. It is preferable to adjust hydrogen and methyl trifluoroacetate reactant flows, temperature and space velocity so that hydrogen is completely reacted in order to avoid expensive separation processes.

Exiting from the reaction zone are $CF_3CH_2OH$ (boiling point 74.5° C.) together with unreacted $CF_3CO_2CH_3$ (boiling point 39°–40° C.), methanol and some hydrogen. Gaseous products of the reaction can be isolated by suitable cooling, such as in a Dry Ice acetone trap. By this procedure, unreacted hydrogen passes through the trap while $CF_3CH_2OH$ and unreacted $CF_3CO_2CH_3$ are obtained as condensate in the trap. The $CF_3CH_2OH$ product can be recovered from the condensate by fractional distillation.

The catalysts useful in the process of this invention are the conventional chromium oxide-copper oxide catalysts useful in reducing an acid or an ester to an alcohol. They can be the conventional copper chromite catalysts such as those described in "Reactions of Hydrogen With Organic Compounds Over Copper-Chromium Oxide and Nickel Catalysts," H. Adkins, Univ. Wisconsin Press (1937). These conventional catalysts consist essentially of chromium oxide and copper oxide and often contain promoting or stabilizing amounts of other metal oxides such as barium oxide, calcium oxide, magnesium oxide, cadmium oxide, lead oxide, silver oxide, and the like. Generally, the weight ratio of chromium oxide to copper oxide is 0.5 to 10:1, preferably 0.5 to 2:1, and the weight ratio of copper oxide to stabilizing metal oxide is 0.5 to 10:1, preferably 2 to 4:1. The preferred catalyst is composed of chromium oxide, copper oxide, and barium oxide in a weight ratio of 3:3:1 respectively.

Various combinations containing oxides of chromium and other metals may be prepared by a number of different procedures, for example: (1) by decomposition of copper-barium ammonium chromates, carbonates or nitrates; (2) by coprecipitating the hydroxides of barium, copper and chromium by addition of a solution of potassium hydroxide to a solution of their nitrates; (3) by the grinding or heating together of the oxides of copper, barium and chromium, etc.

The catalyst may be dispersed or distributed on a carrier material which is inert or active as a hydrogenating agent. Carrier materials useful for this purpose include fuller's earth, silica, alumina, magnesia, mixtures of any two or all three of silica, alumina and magnesia, cement, and the like. When using the carrier material it comprises about 0.1 to 10 times, preferably 0.1 to 1 times the weight of the principal catalytic components, i.e. the chromium and copper oxides.

The catalyst may not require any elaborate pretreatment prior to use in the reaction zone. In some cases, however, it may be desirable to charge the catalyst to the reaction zone for treatment under reaction conditions for the purpose of activation or conversion of the catalyst to an active form. The catalyst thus can be subjected to a preliminary treatment by contact with a hydrogen containing gas or suitable reducing agent prior to use under reaction conditions. The preliminary treatment generally involves contacting the catalyst with hydrogen at a temperature of 100 to 800° C. for a period of 0.5 to 10 hours.

The following example illustrates in detail the method of this invention.

Example I

A barium promoted copper chromite catalyst was prepared by adding 900 milliliters of a solution containing 260 grams of $Cu(NO_3)_2 \cdot 3H_2O$ and 31 grams of $Ba(NO_3)_2$ to 900 milliliters of a solution containing 151 grams of $(NH_4)_2Cr_2O_7$ and 225 milliliters of 28% $NH_4OH$. The precipitate was filtered, washed, dried at 125° C. for 12 hours and pulverized. The precipitate was decomposed carefully over a free flame. The powder changed from orange to black. The catalyst was pelleted before use. About 100 cubic centimeters of the pelleted catalyst were charged into a ⅝ inch internal diameter tubular reactor 36 inches long externally heated over 30 inches of length by an electric furnace provided with automatic temperature control. The material was thoroughly dried by heating at temperatures up to 300° C. in a current of nitrogen then reduced by continued heating for 3 hours, first at about 150° C. with a stream of hydrogen diluted with nitrogen, followed by heating at about 350° C. in a stream of hydrogen.

Internal temperature of the reactor was lowered to 240° C. and a mixture consisting of about 114 grams (0.89 mole) of $CF_3CO_2CH_3$ and about 1.10 moles (26.5 liters) of hydrogen were passed into and through the reactor at a volume hourly space velocity of 400 and a 11.7 second retention time during a period of 1.11 hours. Exit products from the reactor were passed into and through a trap cooled by Dry Ice-acetone wherein organic material was condensed. Fractional distillation of the cold trap condensate (82 grams) effected recovery of 0.386 mole of $CF_3CO_2CH_3$ (B.P. 39°–40° C.) and 0.33 mole $CF_3CH_2OH$ (B.P. 74.5° C.). Thus, of the organic material feed, 37% was converted to the alcohol. Yield based on organic material consumed was 66%.

Trifluoroethanol is useful for a variety of purposes. For example, it is useful as a starting material for the production of trifluoroethyl vinyl ether, $CF_3CH_2OCH=CH_2$, an anesthetic. Trifluoroethanol can also be used as a refrigerant or copolymerized with, for example, methacrylic acid chloride, to give polymers with low refractive indexes and high relative dispersions.

The embodiments of the invention in which an exclusive property or privilege is claimed are defined as follows:

1. A method for the preparation of 2,2,2-trifluoroethanol which comprises passing a vaporous mixture of hydrogen and methyl trifluoroacetate, wherein the hydrogen to methyl trifluoroacetate mole ratio is about 0.25 to 50:1, at a temperature within the range of about 200° to 400° C., at a pressure of one to five atmospheres and at a volume hourly space velocity within the range of 100 to 1000 through a reactor containing a catalyst consisting essentially of chromium oxide, copper oxide and a stabilizing metal oxide selected from the class consisting of barium oxide, calcium oxide, cadmium oxide, magnesium oxide, lead oxide and silver oxide, and separating 2,2,2-trifluoroethanol from the resultant reaction mixture.

2. The method of claim 1 wherein the catalyst consists essentially of chromium oxide and copper oxide.

3. The method of claim 1 wherein the catalyst consists essentially of chromium oxide, copper oxide and barium oxide.

4. The method of claim 2 wherein the weight ratio of chromium oxide to copper oxide is 0.5 to 10:1.

5. The method of claim 1 wherein the weight ratio of chromium oxide to copper oxide is 0.5 to 10:1 and the weight ratio of copper oxide to stabilizing metal oxide is 0.5 to 10:1.

6. The method of claim 2 wherein the weight ratio of chromium oxide to copper oxide is 0.5 to 2:1.

7. The method of claim 1 wherein the weight ratio of chromium oxide to copper oxide is 0.5 to 2:1 and the weight ratio of copper oxide to stabilizing metal oxide is 2 to 4:1.

8. The method of claim 3 wherein the weight ratio of chromium oxide to copper oxide to barium oxide is substantially within the range of about 3:3:1.

9. A method for the preparation of 2,2,2-trifluoroethanol which comprises passing a vaporous mixture of hydrogen and methyl trifluoroacetate, wherein the hydrogen to methyl trifluoroacetate mole ratio is 0.5 to 5:1, at a temperature within the range of about 225° to 325° C., at a pressure of about one atmosphere and at a volume hourly space velocity within the range of about 200 to 500 through a reactor containing a catalyst consisting essentially of chromium oxide, copper oxide and barium oxide, wherein the weight ratio of chromium oxide to copper oxide to barium oxide is substantially within the range of about 3:3:1, and separating 2,2,2-trifluoroethanol from the resultant reaction mixture.

References Cited
UNITED STATES PATENTS

| | | | |
|---|---|---|---|
| 2,911,444 | 11/1959 | Baranauckas et. al. | 260—633 |
| 2,982,789 | 5/1961 | Smith et al. | 260—633 |

FOREIGN PATENTS

| | | |
|---|---|---|
| 760,769 | 11/1956 | Great Britain. |

BERNARD HELFIN, *Primary Examiner.*

LEON ZITVER, *Examiner.*

J. E. EVANS, *Assistant Examiner.*